United States Patent [19]

Persson

[11] Patent Number: 5,303,800

[45] Date of Patent: Apr. 19, 1994

[54] CLOSED LUBRICATION SYSTEM FOR WHEEL HUB BEARINGS

[76] Inventor: Kenneth Persson, 161 Phillips La., Lake Mills, Wis. 53551

[21] Appl. No.: 950,439

[22] Filed: Sep. 23, 1992

[51] Int. Cl.⁵ ............................................. F16C 1/24
[52] U.S. Cl. ..................... 184/5.1; 184/45.1; 384/471; 301/108.1; 301/108.3
[58] Field of Search ............ 184/5.1, 45.1, 45.2; 384/462, 471; 301/108.1, 108.2, 108.3, 108.4, 108.5

[56] References Cited

U.S. PATENT DOCUMENTS

| 915,731 | 3/1909 | Brigham . | |
|---|---|---|---|
| 960,341 | 6/1910 | Kincaid . | |
| 2,526,568 | 10/1950 | Leonard . | |
| 2,611,668 | 9/1952 | Douglass | 384/471 |
| 2,676,073 | 4/1954 | Boden . | |
| 2,857,020 | 10/1958 | Otto | 184/45.1 |
| 3,393,015 | 7/1968 | Kaufman | 301/108.1 |
| 3,395,950 | 8/1968 | Brandt | 301/108.1 |
| 3,642,327 | 2/1972 | Walther | 301/108.1 |
| 3,983,958 | 10/1976 | Swearingen . | |
| 4,039,229 | 8/1977 | Ohlberg . | |
| 4,058,185 | 11/1977 | Ploeger . | |
| 4,106,816 | 8/1978 | August . | |
| 4,190,133 | 2/1980 | Ploeger . | |
| 4,784,500 | 11/1988 | Prokop . | |
| 4,941,550 | 7/1990 | Blake . | |

FOREIGN PATENT DOCUMENTS

| 619669 | 5/1961 | Canada | 184/45.1 |
|---|---|---|---|
| 1163849 | 10/1958 | France | 184/45.1 |

Primary Examiner—Thomas E. Denion
Attorney, Agent, or Firm—Stroud, Stroud, Willink, Thompson & Howard

[57] ABSTRACT

A lubricator for the bearings of a wheel hub that includes a bellows for accommodating changes in pressure in the wheel hub and utilizes a nongrease lubricant. Methods of manufacturing the lubricator and of lubricating wheel bearings are also provided.

20 Claims, 3 Drawing Sheets

CLOSED LUBRICATION SYSTEM FOR WHEEL HUB BEARINGS

TECHNICAL FIELD

This invention relates generally to hub assemblies, and more specifically to a sealed hub cover lubricator used on a wheel bearing housing. The lubricator of the present invention is particularly well suited for use on the hub assemblies of boat trailers or other vehicles which are periodically subjected to pressure and temperature changes.

BACKGROUND OF THE INVENTION

Conventional axle-hub assemblies include a stationary axle or spindle that supports a pair of spaced apart wheel bearings which, in turn, support a rotatable hub or wheel bearing housing. Most hub assemblies are constructed such that there is usually a lubricating cavity filled completely or partially with a lubricant, usually grease, that is applied to the bearings. Trailers such as boat trailers, utility trailers, cattle trailers, and the like, all utilize such wheel bearings assemblies.

Many present hub assemblies allow contaminants, e.g., dirty air and water, to enter the bearing housing contaminating the grease and reducing the effectiveness of and shortening the life of the hub assembly. The entry of such contaminants is generally related to variations of temperature and pressure in the bearing housing. When the housing is exposed to high temperatures, e.g., when the temperature increases as a trailer is being towed, gases, such as air, and grease, in the hub expand and are expelled from the structure. If the bearing assembly is packed tight with grease and designed so that no air or grease can escape without accommodating the pressure changes, the increased pressure in the hub causes damage to the bearing seals and the inside of the hub, which may not be immediately noticed but will result in the bearings becoming dry and freezing. When a hot trailer is suddenly cooled, e.g., when a boat trailer is submerged in water during boat launching, there is contraction of the grease and gases that tends to create a vacuum and suck water into the bearing housing. The water washes the grease from within the housing, causing the wheel bearings to be improperly lubricated and often ruined, due to friction and excessive heat while the trailer is towed.

The circumstances of use necessitate that the bearings be frequently lubricated, a time-consuming task. The trailer must be jacked up to free the wheel, the wheel and bearing hub removed, and the bearings then removed from the bearing housing in the wheel, washed free of old grease, repacked with new grease, and replaced in the bearing housing. Ultimately, one or both of the bearings will require replacement.

Various devices for lubricating wheel bearings and other bearings are known in the art. For example, some patents have addressed the problem of automatically supplying lubricant to a machine. See, for example, U.S. Pat. No. 915,731 issued to Brigham that discloses an oil chamber having multiple outlets from which oil is supplied to different parts of a machine to be lubricated, along with means for supplying the chamber with oil under pressure and control devices for regulating the automatic flow of oil through the outlets in a selected time period, and U.S. Pat. No. 2,526,568 issued to Leonard that discloses a lubricating apparatus which includes a measuring valve adaptable for use in a machine with either grease or oil as the lubricant.

Other patents have described systems for ascertaining the level of lubricant in a housing so that lubricant can be timely replaced. See, for example, U.S. Pat. No. 3,983,958 issued to Swearingen that discloses an apparatus designed for attachment to a bearing housing. The apparatus has an access conduit that allows observation of the level of the oil in the lubricating housing, thereby permitting a desired oil level in the bearing housing to be maintained. U.S. Pat. No. 960,341 to Kincaid discloses a grease reservoir adapted to contain a stick of semi-solid lubricant. The reservoir serves as an auxiliary grease chamber and includes a spring-press plunger adapted to indicate the quantity of grease contained in the reservoir.

Other devices, many of which are patterned after the aforementioned Kincaid patent, are self-lubricating devices. These devices include a grease chamber disposed within a cylindrical housing, a spring-loaded plate slidably mounted in the housing, a grease fitting provided in the housing for charging the housing with grease and forcing the spring-loaded plate outwardly. The spring-loaded plate continually exerts pressure against the grease and causes the grease to enter the wheel bearing housing and coat the wheel bearings. Patents that describe such a spring-loaded piston system include U.S. Pat. No. 4,941,550 issued to Blake, U.S. Pat. No. 4,784,500 issued to Prokop, U.S. Pat. No. 4,106,816 issued to August, and U.S. Pat. Nos. 4,190,133 and 4,058,185 issued to Ploeger.

Still other prior art devices have addressed the problem of pressure changes in the wheel hub especially in particular applications where the bearing houses are exposed to high temperatures. Such devices incorporate a flexible diaphragm in the device. See, for example, U.S. Pat. No. 2,676,073 issued to Boden (railway cars) and U.S. Pat. No. 4,039,229 issued to Ohlberg (grate cars for sintering machines).

The self-lubricating devices, however, tend to be very complex structures. Most lack facility for quickly determining when the housing needs recharging with grease and do not permit quick and efficient recharging, without overcharging. Moreover, for those devices that attempt to use diaphragms to accommodate pressure changes, the construction typically requires isolation of the diaphragm from the grease lubricant.

Despite recognition of the many practical problems associated with lubrication of wheel hubs, proper solution to all these problems in a single device has not yet been demonstrated in the prior art. None of the prior art devices provides a lubricating device of simple construction that is sealed and eliminates water and other contaminants from being drawn into the hub, adjusts to temperature and pressure differentials in the hub, and utilizes an easy to handle, fluid lubricant which facilitates charging of the hub.

SUMMARY OF THE INVENTION

The present invention responds specifically to the long-felt need heretofore unmet by the prior art, and especially with a view to overcoming the inherent inadequacies of prior hub lubricating devices. The present invention provides a lubricator for a hub or wheel bearing housing that is simple in construction and allows for expansion and contraction of lubricant and gases in the bearing housing without permitting containments to invade the bearing housing or permitting lubricant to escape into the environment. The lubricator utilizes a biodegradable lubricant.

The foregoing, and other advantages of the present invention, are realized in one aspect thereof in a lubricator, engagable with a wheel hub, for lubricating the bearings of the wheel hub. The lubricator includes a housing having a bellows compartment and a lubricant compartment. A bellows is disposed and restricted in translational movement within the bellows compartment of the housing. The bellows expands and contracts responsive to changes in pressure in the wheel hub and can accommodate pressure changes up to about 6 pounds per square inch. The bellows serves as a moveable wall for containing a lubricant in the lubricant compartment.

The bellows includes a diaphragm portion having a peripheral edge and a bellows seat portion. The bellows compartment also includes a spring, a spring guide upon which the spring is disposed, and a retaining ring fixed to the inside of the housing and sealing the peripheral edge of the bellows. The spring exerts pressure against the bellows seat portion of the bellows. The housing also includes a lubricant port disposed in a side wall of the lubricant compartment for introducing a lubricant into the housing.

The lubricator in accordance with the present invention uses an improved lubricant in the form of a glycol which is equivalent in viscosity to 30 to 50 weight oil. This lubricant disburses heat faster and more uniformly than grease, thereby decreasing the pressure on the bearing seals and improving the life of the bearings.

In another aspect, the invention is a method for lubricating the bearings of a wheel hub. The method includes sealingly engaging a lubricator as described hereinbefore on a wheel hub, filling the lubricator with a lubricant through the lubricant port; rotating the wheel hub wherein the centrifugal force so created forces the lubricant into the bearings.

In another aspect, the invention is a method of manufacturing a wheel hub lubricator device that includes disposing a spring in a closed end of a housing that has an open end and is configured for sealingly engaging a wheel hub; engaging a bellows having a peripheral edge, for accommodating changes in pressure against the spring; securing a retaining ring in the housing to limit the movement of the bellows and forming a seal with the peripheral edge of the bellows; and providing a lubricant port in a side wall of the housing proximate the open end.

In yet another aspect, the invention is a lubricating system for a wheel hub of the type that includes an axle having an inner end and an outer end, inner and outer bearing assemblies spaced along the axle, and a hub housing around the axle and rotatable on the bearing assemblies. The system includes a housing for receiving and holding a lubricant for the bearing assemblies and which housing sealingly engages with the wheel hub; a lubricant; a lubricant port for charging the lubricator and wheel hub with the lubricant; a bellows disposed within the housing and restricted to a predetermined space by a retaining ring; the bellows being expandable and contractible in response to pressure changes in the wheel hub, and a spring that urges the bellows toward the retaining ring wherein rotation of the hub housing causes a resulting centrifugal force to force the lubricant against the bearing assemblies.

Other principal features and advantages of the invention will become apparent to those skilled in the art upon review of the following drawings, the detailed description and the appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which.

DETAILED DESCRIPTION

The present invention relates broadly to wheel and axle assemblies, and more specifically, to lubricating systems of wheel bearings used in such assemblies. However, the device of the present invention is especially well adapted for use with wheel bearings that are subjected to periodic immersion in water, as, for example, in boat trailers during the launching and recovery of a boat. Accordingly, the invention will be described in detail with respect to such endeavors; however, those skilled in the art will appreciate that such a description of the invention is meant to be exemplary only and should not be viewed as limitative of the full scope thereof.

The present invention provides a lubricator for bearings of a wheel hub. The lubricator of the present invention includes a sealed, nonvented cap and is characterized by an ability to prevent the entry of water and air into the wheel hub, and an ability to accommodate pressure changes, as well as concomitant temperature changes, in the wheel hub. These attributes are achieved by a novel structure having a special combination of physical features and liquid lubricant.

The lubricator of the present invention includes a cap that can be secured to the outer end of a wheel hub of a vehicle. A wheel hub typically includes a set of inner and outer bearings. The cap includes a bellows secured therein and has a lubricant port for introducing a lubricant into the cap and wheel hub. The internal bellows permits the lubricator to accommodate changes in temperature, and therefore pressure within the wheel hub. When a vehicle is traveling, the temperature of the gases, i.e., air, and lubricant in the wheel hub increase and the pressure in the wheel hub concomitantly increases. The bellows expands to allow for the resulting expansion of gas and lubricant. As the temperature of the wheel hub decreases, e.g., dramatically drops through exposure to cold water such as when a boat is being launched, the pressure decreases and the bellows contracts. A spring that resides over a spring seat inside the cap provides a uniform pressure against the bellows. The use of bellows to accommodate pressure changes inside a sealed assembly eliminates the need for pressure venting and the introduction of contaminants into the bearings, reduces the possibility of oozing of lubricant out of the bearings, and reduces the pressure on the bearing seals. The device of the present invention also utilizes an improved biodegradable lubricant.

Figure 1:
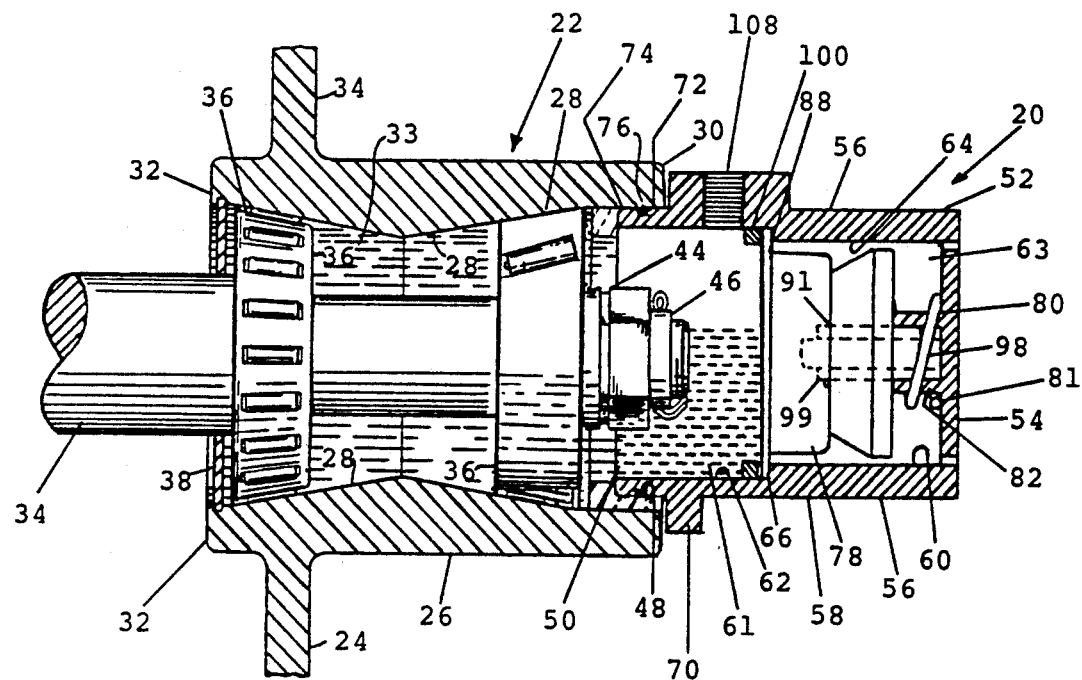
FIG. 1 is a longitudinal sectional view through a wheel bearing lubricator in accordance with the present invention shown engaged in wheel hub.
Figure 2:
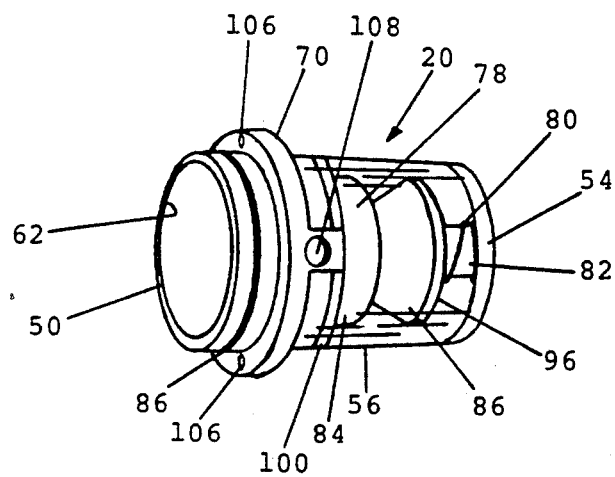
FIG. 2 is a perspective view of the lubricator in accordance with the present invention.
Figure 3:
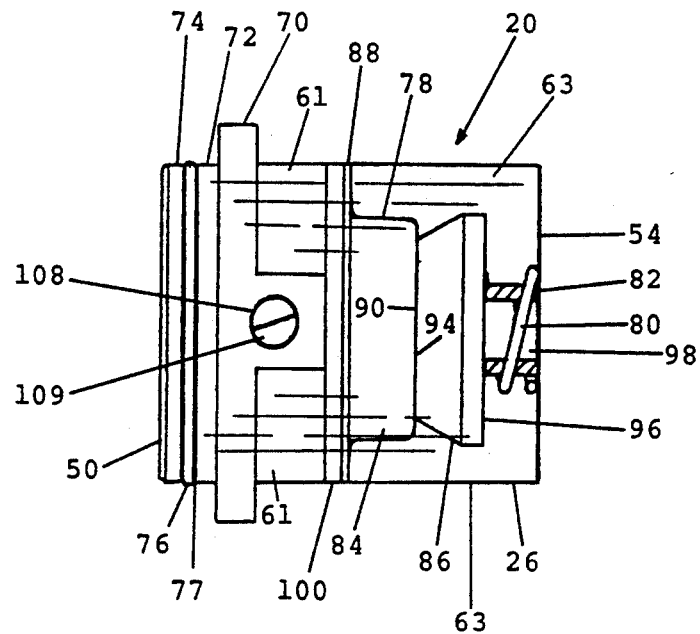
FIG. 3 is a side elevational view of the lubricator.

Reference is initially made to FIG. 1 in which the numeral 22 generally designates a conventional wheel hub of a vehicle, such as, for example, a trailer for a boat or the like, that has been modified by replacing a conventional hub cap secured to the outer end of the hub with a lubricator in accordance with the present invention and generally designated as 20, as will be more fully explained hereinafter.

In the illustrated embodiment, the wheel hub 22 is a generally cylindrical structure and has radially extending structural members 24 for connection with a wheel (not shown). Hub 22 includes a bearings housing 26 having a pair of beveled bearing surfaces 28. Housing 26 includes an outer end 30, an inner end 32, and a hub cavity 33, and encloses an axle or shaft 34 having a pair of tapered roller bearings 36 mounted thereon in a spaced-apart, opposed and parallel manner. The inner end 32 of the hub 22 is provided with a seal member 38 that prevents the flow of lubricant from the hub cavity 33. The outer most end 42 of the axle 34 is threaded and connects with a retainer 44 and safety lock mechanism 46. The outer end 30 of the bearings housing 26 is slightly tapered and includes a smooth interior surface 48 for receiving an open end 50 of the lubricator 20 as is later described. Wheel hubs of the general type illustrated in the drawing are well known to persons skilled in the art and further description thereof is not deemed necessary, except with regard to accomplishing the objectives of the invention.

With reference to FIGS. 2-7, lubricator 20 includes a cap or housing 52 that is generally tubular in shape, preferably substantially cylindrical. Housing 52 includes a closed end wall 54, integrally attached side wall 56, and open end 50. Sidewall 56 has an exterior surface 58 extending from closed end wall 54, is substantially cylindrical, and has a cylindrical bore or inner surface 60 therein. Housing 52 includes a lubricant compartment 61 and a bellows compartment 63 contiguously arranged in the interior of housing 52. Inner surface 60 includes a top surface portion 62 corresponding to the bore of lubricant compartment 61 and a bottom surface portion 64 corresponding to the bore of bellows compartment 63. The diameter of the bore across bellows compartment 63 is smaller than the bore of lubricant compartment 61, thus forming a shoulder 66 at the junction of the two bores. For a 6000 pound carrying axle, housing 52 is suitably about 2½ inches in length and the bore of bellows compartment 63 about 1½ inches while the bore of lubricant compartment 61 is about 1¾ inches.

In the illustrated structure, the cylindrical sidewall 56 terminates at open end 50. A collar portion 70 is formed on exterior surface 58 proximate open end 50 and serves a stop when lubricator 20 is fit into hub 22. Collar portion 70 protrudes from surface 58 and the diameter across collar 70 is larger than that across housing 52. A portion 72 of sidewall 56 extends from collar 70 to open end 50. Portion 72 has an exterior surface 74. Exterior surface 74 adjacent to open end 50 is smooth and tapered inwardly slightly, and engages interior surface 48 of hub 22 in mated fashion to suitably connect, as, e.g., by a compression fit, lubricator 20 with the hub 22 such that lubricator 20 forms a closure cap therefor. This fit is sealed by an O-ring 76, e.g., a Hi-Tech Flexible Products, Inc., Dash #032 NBR (nitrile) O-ring, that resides about sidewall portion 72 in a groove 77. O-ring 76, inserted into groove 77, allows for any irregularities in interior surface 48 when lubricator 20 is engaged with hub 22.

A bellows 78 is sealingly mounted within bellows compartment 63 of the housing 52 and a resilient member or spring 80 urges the bellows 78 toward the open end 50. Resilient or spring member 80 is in the form of a helical coil spring having one end 81 engaging the closed end 54 of the housing 52 and the other end 83 engaging a bellows bottom member 86 and surrounding a spring guide 82. As the spring 80 may be subjected to periodic immersion in water, it is preferably constructed of a noncorrosive metal such as stainless steel or the like. Spring 80 is suitably about a 4 lb. spring. Spring guide 82 is substantially tubular, extending centrally from closed end wall 54 and having an inner bore 85.

Bellows 78 is expandable and contractible, and provides a moveable wall for containing the lubricant in lubricant compartment 61. Bellows 78 includes two oppositely extending substantially cup-shaped members, a top member 84 and the bottom member 86. Top member 84 is a flexible diaphragm, being suitably constructed of a silicone rubber or the like, e.g., Minnesota Rubber Silicone Rubber No. 71174, and has a peripheral edge 88 and a bottom 90. Peripheral edge 88 is substantially circular and configured to rest on shoulder 66 where peripheral edge 88 is sealed with a ring 100 as described hereinbelow. Bottom member 86 is a rigid, hollow bellows seat, substantially frustoconical in shape, having a top 94, a bottom edge 96 and a central tubular portion 98. Tubular portion 98 extends beyond bottom edge 96 and has a top tubular portion 99 which extends somewhat beyond top surface 94. Bottom 90 of diaphragm 84 and top tubular portion 99 are joined by a metal snap ring 91. The inner bore 85 of spring guide 82 receives tubular portion 98. Bellows bottom member or seat 86 is suitably constructed of a polymeric material such as polyethylene.

Stop or retaining ring 100 limits the movement of the bellows 78 toward the open end 50 and forms a seal about periphery 88. In the illustrated structure, the retaining ring 100 is in the form of a disc having a central aperture 102 and is sized to fit within the open end 50 portion of the housing 52, concentric about interior surface 62 and resting in shoulder 66. When so positioned, the ring 100 engages the periphery 88 of bellows top member 84 on shoulder 66. The ring 100 is fixed in place on shoulder 66 by, e.g., ultrasonic welding. The fixing of ring 100 also fixes peripheral edge 88 of bellows 78, and forms an air-tight seal, thus defining bellows compartment 63 in bottom portion 64 and lubricant compartment 61 in top portion 62 of housing 52.

Closed end wall 54 includes vent apertures 104 that provide atmospheric pressure to the neutral side, i.e., side facing closed end 54, of bellows 78.

Two holes 106 are suitably molded into collar 70 of the lubricator 20 to receive, e.g., two screws to be drilled and tapped into the hub 22 for additional security.

A lubricant port or aperture 108 for filling and draining lubricator 20 and the hub 22 with a lubricant 110, is suitably disposed in side wall 56 of lubricant compartment 61. Port 108 is suitably formed in a portion of Collar 70 of the housing 52. Port 108 is covered with a plug 109, e.g., a ⅛-inch pipe plug. Lubricator 20 is charged with lubricant 110 through port 108 from which lubricant 110 communicates with the wheel hub 22 and bearings 36.

The housing 52 and the ring 100 are suitably constructed of a molded transparent polymeric material, for example, a polycarbonate resin such as Lexan ™ or Plexiglas ™.

Figure 4:
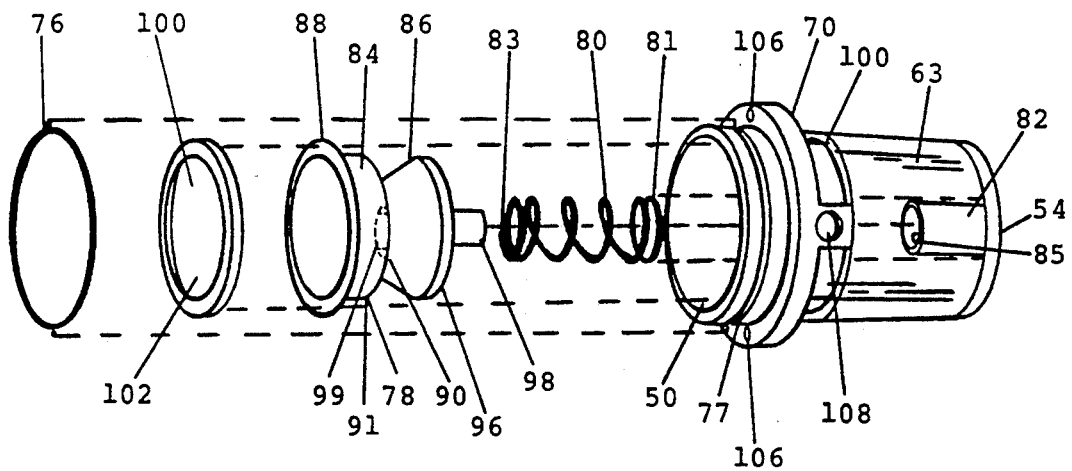
FIG. 4 is an exploded view of the lubricator.
Figure 5:
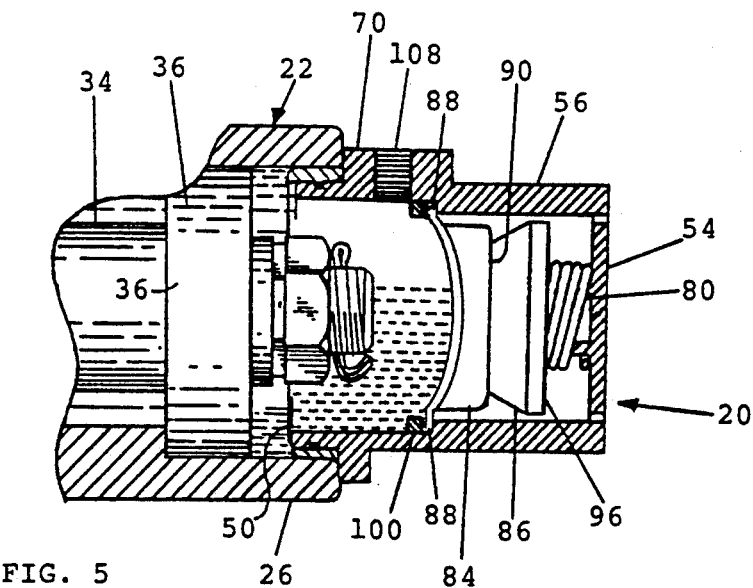
FIG. 5 is a longitudinal sectional view through the lubricator with the bellows engagingly compressing the spring.
Figure 7:
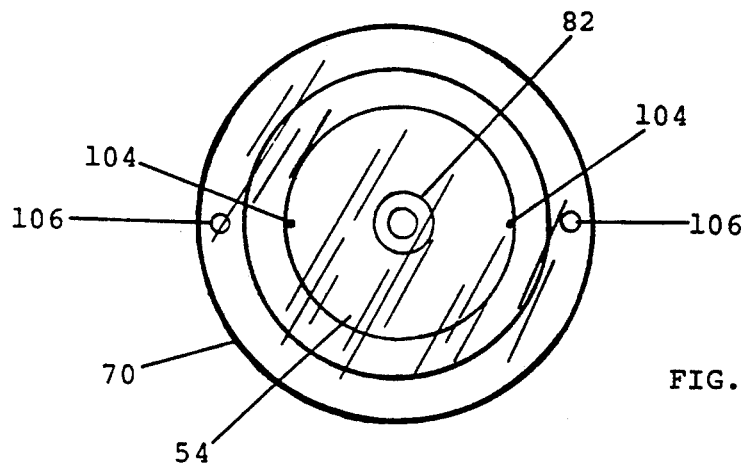
FIG. 7 is an end elevational view of the lubricator taken from the closed end.
Figure 6:
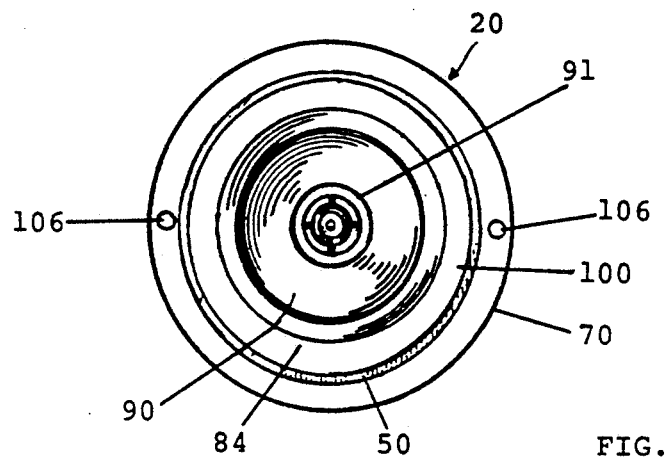
FIG. 6 is an end elevational view of the lubricator taken from the open end thereof.

As best seen in FIG. 4, the lubricator 20 in accordance with the present invention is easily assembled by placing the spring 80 in the housing 52 with the spring end 108 engaging the end wall 54 of the housing 52. The tubular portion 98 of bellows 78 is then inserted into spring guide 82 with peripheral edge 88 of bellows top member 84 resting on shoulder 66. The ring 100 is then placed into the tubular member 52 and secured to hold peripheral edge 88 in place thereby forming the bellows chamber 63. The O-ring 76 is then placed in groove 77 and is pressed therein to complete the assembly of the structure.

In use, the open end 50 of housing 52 is engaged in the outer end 30 of the bore 48 of the hub 22 and is pressed therein to fix the housing 52 to the hub 22, thereby closing the open end 30 of hub 22 so that the housing 52 serves as cover cap for the bearing hub cavity 33. A source of lubricant is connected to the lubricator port 108. A suitable lubricant such as a glycol, e.g., polyglycol or diethylene glycol, preferably polyglycol such as klotz-200 ™, having a viscosity equivalent of 30–50 weight oil, is charged through the port 108 and into the lubricant compartment 61 of housing 52 into the hub cavity 33. Such a lubricant is formulated and designed to encapsulate moisture if any should get into the hub, and continues to lubricate, not separate from the water, as oil or grease do, when water enters the hub. Lubricity of the lubricant in accordance with the present is maintained with up to 30% water contamination. In one test of lubricosity, it was found that a lubricant mixture container 20% water maintained lubricosity for at least 32,600 miles at approximately 30 miles per hour. The maintained lubricosity of the lubricant causes less friction and, thus, reduces heat buildup, than with a grease lubricant. The lubricant's ability to mix with the water eliminates the pitting of the bearings and extends the life of the bearing assembly. Further, the lubricant is biodegradable and, unlike grease, is not an environmental contaminant.

To insure that the hub cavity 33 is fully lubricated, lubricant is injected into the lubricator port 108 until hub cavity 33 is about 20% filled. At this point, the bellows is in a neutral position, i.e., the pressure on both sides of the bellows is the atmospheric pressure. Rotation of the wheel hub creates a centrifugal force that forces the lubricant onto the bearings. The application of the lubricant is then stopped and the source of the lubricant disconnected from the port.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

I claim:

1. A lubricator for wheel hub bearings, comprising:
   a housing having a closed end, an open end spaced apart from said closed end, and a sidewall extending from said closed end to said open end, said open end sealingly engagable with a wheel hub;
   a bellows having a peripheral edge, operatively disposed in said housing, for expansion and contraction responsive to changes in pressure in said wheel hub;
   a spring positioned between said bellows and said closed end, for urging said bellows toward said open end upon contraction of said bellows;
   a retaining ring fixed in said housing, for limiting movement of said bellows toward said open end and forming an air-tight seal with said peripheral edge of said bellows; and
   a lubricant port disposed in said sidewall of said housing proximate said open end, for introducing a lubricant into said housing and said wheel hub.

2. The lubricator of claim 1, further comprising a collar proximate said open end to act as a stop when engaging said wheel hub.

3. The lubricator of claim 1, wherein said open end of said housing includes an annular flexible ring for sealingly engaging said wheel hub.

4. The lubricator of claim 1, wherein said housing is made of a polycarbonate polymeric material.

5. The lubricator of claim 1, wherein said bellows includes a diaphragm portion and a bellows seat portion and said diaphragm portion is made of a silicone rubber.

6. The lubricator of claim 1, wherein said bellows can accommodate pressure changes up to about 6 pounds per square inch.

7. The lubricator of claim 1, wherein said spring is constructed of stainless steel.

8. The lubricator of claim 1, wherein said lubricant is biodegradable and miscible with water.

9. The lubricator of claim 8, wherein said lubricant is a glycol which has a viscosity equivalent to a 30- to 50-weight oil.

10. The lubricator of claim 9, wherein said glycol is polyglycol.

11. A method for lubricating the bearings of a wheel hub having an outer end and an inner end, comprising:
    sealingly engaging a lubricator cap with the wheel hub, said cap including a housing having a bellows compartment and a lubricant compartment, said lubricant compartment sealingly engagable with a wheel hub; a bellows disposed and restricted within said bellows compartment, for expansion and contraction responsive to changes in pressure in said wheel hub, a retaining ring fixedly attached to said housing of said cap, said bellows fixedly attached to said housing of said cap by said retaining ring, and a lubricant port disposed in a sidewall portion of said lubricant compartment of said housing, for introducing a lubricant into said housing and said wheel hub;
    filling said cap with a lubricant through said lubricant port; and
    rotating said wheel hub wherein the centrifugal force so created forces said lubricant into the bearings.

12. The method of claim 11, wherein said lubricant is a glycol which is equivalent in viscosity to 30- to 50-weight oil.

13. The method of claim 11, wherein said bellows includes a diaphragm portion and a bellows seat portion and can accommodate pressure changes up to about 6 pounds per square inch.

14. A method of manufacturing a wheel hub lubricator device, comprising:

disposing spring on a spring guide in a closed end portion of a housing having an open end portion configured for sealingly engaging a wheel hub, engaging a bellows having a peripheral edge against said spring, securing a retaining ring in said housing to limit the movement of said bellows and fixedly sealing said peripheral edge of said bellows with said retaining ring to said housing to form a bellows compartment and a lubricant compartment interiorly of said housing, and providing a lubricant port in a sidewall portion of said lubricant compartment of said housing.

15. The method of claim 14, wherein said bellows includes a diaphragm portion and a bellows seat portion and said diaphragm portion is made of a silicone rubber, said bellows accommodating pressure changes up to about 6 pounds per square inch.

16. A lubricating system for a wheel hub of the type which includes an axle and an outer end, inner and outer bearing assemblies spaced along said axle, and a hub housing around the bearing assemblies and rotatable on said bearing assemblies, said system comprising:

a lubricant for lubricating the bearing assemblies;

a housing sealingly engaging the wheel hub, said housing including a bellows compartment and a lubricant compartment, said lubricant compartment holding said lubricant;

a bellows having a peripheral edge, disposed within said housing, a retaining ring secured within said housing, for restraining said bellows and fixedly sealing said peripheral edge of said bellows to divide said housing into said bellows compartment and said lubricant compartment, said bellows being a moveable wall for confining said lubricant in said lubricant compartment, and a spring urging said bellows against said retaining ring upon a contraction of said bellows, wherein rotation of the hub housing causes a resulting centrifugal force to force said lubricant against the bearing assemblies.

17. A method for lubricating the bearings of a wheel hub, comprising:

disposing spring on a spring guide in a closed end portion of a housing having an open end portion configured for sealingly engaging a wheel hub;

engaging a bellows having a peripheral edge, for accommodating changes in pressure against said spring wherein upon a decrease in pressure in said bellows, said bellows and said spring are urged toward said open end portion of said housing;

securing a retaining ring in said housing to limit the movement of said bellows and form an air-tight seal with said peripheral edge of said bellows;

providing a lubricant port in a sidewall portion of said open end portion of said housing;

sealingly fixing said open end portion of said housing to the outer end of the wheel hub;

filling said housing with a lubricant through said lubricant port; and rotating said wheel hub wherein the centrifugal force so created forces said lubricant into the bearings.

18. A lubricator for wheel hub bearings, comprising:

a housing having a bellows compartment and a lubricant compartment, said lubricant compartment sealingly engagable with a wheel hub;

a bellows disposed and restricted within said bellows compartment, for expansion and contraction responsive to changes in pressure in said wheel hub, said bellows fixedly attached to said housing; and a lubricant port disposed in a sidewall portion of said lubricant compartment of said housing, for introducing a lubricant into said housing and said wheel hub.

19. The lubricator of claim 18, wherein said bellows compartment includes a spring guide and a spring disposed upon said spring guide, and said bellows includes a diaphragm portion and a bellows seat portion seated in said spring guide.

20. The lubricator of claim 18, wherein said bellows serves as a moveable wall for containing a lubricant in said lubricant compartment.

* * * * *